J. HUGGLER.
MILKING MACHINE.
APPLICATION FILED SEPT. 21, 1911.

1,034,454.

Patented Aug. 6, 1912.

WITNESSES:
J. H. Swan.
O. M. McLaughlin

INVENTOR.
John Huggler.
BY
D. H. Lockwood
ATTORNEY.

UNITED STATES PATENT OFFICE.

JOHN HUGGLER, OF INDIANAPOLIS, INDIANA.

MILKING-MACHINE.

1,034,454.  Specification of Letters Patent.  Patented Aug. 6, 1912.

Application filed September 21, 1911. Serial No. 650,985.

*To all whom it may concern:*

Be it known that I, JOHN HUGGLER, a citizen of the United States, and a resident of Indianapolis, county of Marion, and State of Indiana, have invented a certain useful Milking-Machine; and I do hereby declare that the following is a full, clear, and exact description thereof, reference being had to the accompanying drawings.

The object of this invention is to provide a machine for milking cows and other animals which shall be of simple construction with but few parts and easily operated such that the operation of milking may be speedily performed and the stripping process be done efficiently without any injury to the animal.

A further object is to provide a machine which shall be easily cleansed but which shall not come in contact with the milk and thus render the milking operation more sanitary than in those machines through which the milk is caused to flow in the operation thereof.

The chief feature of the invention lies in providing the mechanism with hand-like portions which surround the teats of the animal and with power driven means for drawing down the milk, the action of which closely resembles the milking action of the human hand.

A further feature lies in the means for adjusting the positions of the teat holders to fit different animals.

The nature of the invention will be understood from the accompanying drawings and the following description and claims.

Figure 1:
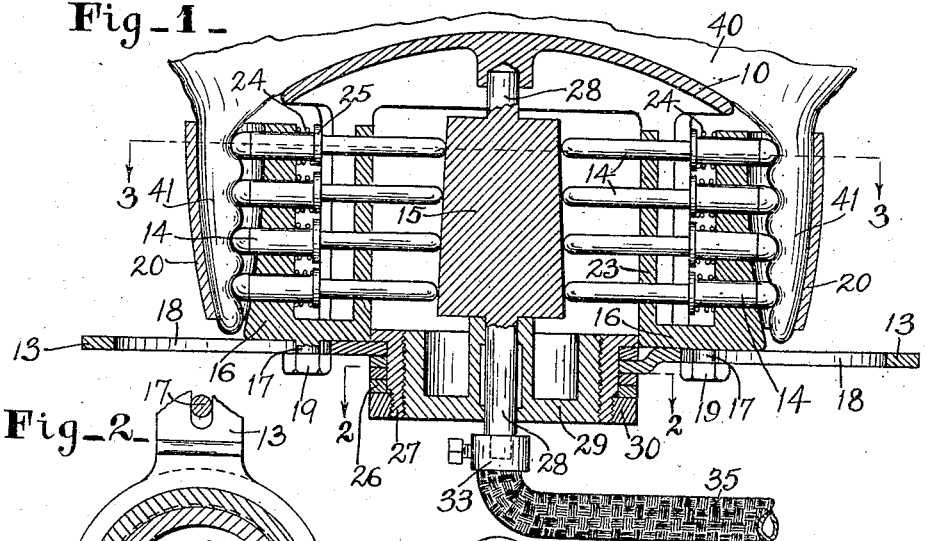
Figure 2:
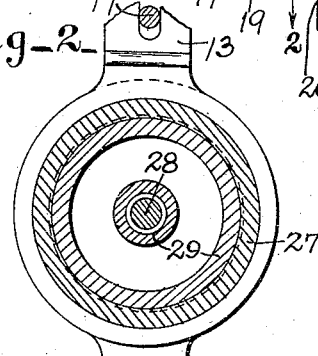
Figure 4:
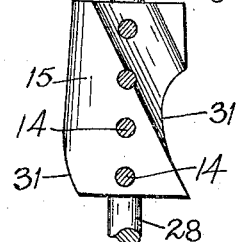
Figure 3:
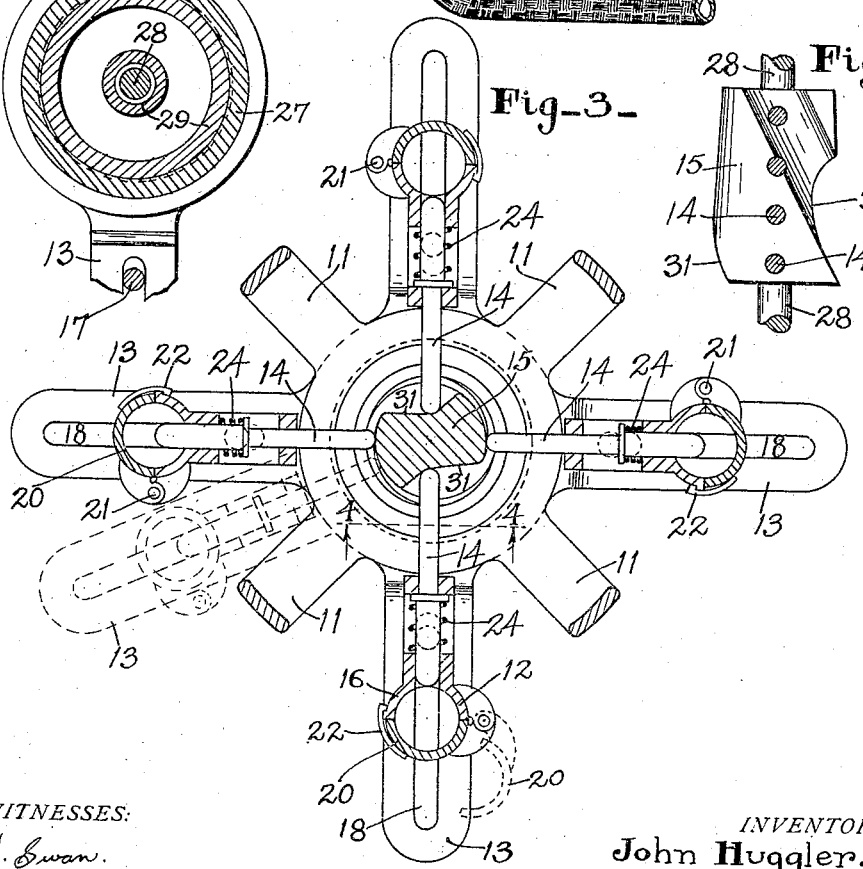

In the drawings, Figure 1 is a partial section midway of the device, showing all of the fingers in operative position. Fig. 2 is a horizontal section on the line 2—2 of Fig. 1. Fig. 3 is a section on the line 3—3 of Fig. 1. Fig. 4 is a vertical section on the line 4—4 of Fig. 3, with portions removed and showing the operating cone.

In detail there is shown in the drawings a milking machine applicable to a cow's udder 40 with a cover 10, base 11, and teat holders 12 mounted upon adjustable arms 13 which are supported upon said base 11 and having operating fingers 14 extending through the walls of said teat holders actuated by the rotation of the cone 15 which has bearing in said cover 10 and base 11.

The teat holders 12 are formed after the fashion of a partially closed hand and consist of two parts, a stationary part 16 having a downward projection 17 through a slot 18 in the adjustable arm 13 and secured in position by a nut 19 on said projection 17 and a movable portion 20 secured by spring hinge 21 to the stationary portion 16. A spring latch 22 secures the two parts when in a closed position. The interior of the holder is circular in cross section and decreases in diameter toward the lower end to conform to the outline of the animal's teat 41 and is lined with sheet rubber or other resilient material. There are four openings, one above the other, through the stationary portion 16 of the teat holder and substantially midway thereof through which extend four milking fingers 14. Said milking fingers are reciprocably mounted in and are held in alinement by the stationary part 16 of the teat holder and an upward extension 23 from the inner end of said stationary part 16. The ends of the fingers 14, which are pushed within the teat holder, have rounded cushioned heads and by means of springs 24 surrounding the fingers 14 and pressing against the bearing 23 and collars 25 secured on the fingers, the rounded inner ends of said milking fingers 14 are forced against the operating cone 15, hereafter described.

The adjustable arms 13 have looped inner ends 26 which surround an annular projection 27 from the lower side of the base 11. One of said arms is in alinement with its loop, see Fig. 1, but the other three loops are offset slightly in order that they may have bearing on the said annular projection 27, yet have their arms all lying in the same plane. A nut 30 is threaded on the lower end of the annular projection 27 and serves to hold the loop portions of the arms 13 together and their outer ends in alinement.

The cone 15 is mounted upon a shaft 28 which has bearings in the cover 10 and in a plug 29 which is threaded within the annular projection 27, see Fig. 1. Said cone 15 has two oppositely disposed recesses 31 in the surface thereof extending spirally about the cone from left to right, as seen in Fig. 4. The rate of taper of the cone is substantially the same as that of the animal's teat, but the taper of the cone extends in the opposite direction from that in the teat holder, that is, it flares outwardly from the top. The fingers 14 are caused to bear against the cone 15 by the springs 24 and on meeting the recessed portions 31 will be withdrawn from the teat holder. The lower end of the shaft 28 is shouldered down and said shouldered portion 33, preferably square in cross section, fits within a corresponding socket on the end of a flexible shaft 35 which is driven from any desired source of power.

To operate the machine the hinged portions 20 of the teat holders 12 are thrown open, as shown by the dotted lines on the lower part of Fig. 3, and the whole device lifted so that the cover 10 will press upwardly against the central underside of the udder of the animal to be milked and the teats will lie against the stationary portions 16 of the teat holders after which the teat holders 20 are closed about the teat and power is applied to the flexible shaft 35 and the cone 15 caused to revolve. As the cone revolves, the recesses therein will come opposite the fingers 14 whereupon they will be pressed inwardly by the springs 24. Further rotation of the cone will force the fingers 14 outward and cause them to press, in turn, against the teats within the teat holders. The recesses 31 on the face of the cone 15 are so designed and so positioned on the cone that the upper finger, as shown in Fig. 1, will be the first to be pressed outwardly, being followed by the second, third and fourth fingers, in turn. Thus it will be seen that the passage in the teat will be closed by the first or upper finger and as the lower fingers are forced outwardly by the cone, they, in turn, will have the same action in forcing the milk downwardly as do a man's fingers in milking. The last or fourth finger serves to press the last of the milk out of the teat and causes a thorough stripping action. A further purpose of having recesses lying spirally about the cone is that the lower or fourth finger will remain in its outward position until the three upper fingers have been released, thus allowing the milk to flow downwardly into the teat, and until the first or upper finger is forced outwardly. Thus it will be understood that there is always a gripping of the teat and it would be possible to use this machine without supplying any means for supporting it from the ground. The cone here shown has two recesses, but more could be used without departing from the spirit of the invention. As often happens the distance between teats varies on different animals and to provide for this, the teat holder 12 can be adjusted along the arm 13 by means of the slot 18 and nut 19, as before described, moving them either toward or away from the cone. The length of the fingers 14 remains the same, but the plug 29 may be unscrewed from the annular projection 27, thus withdrawing the cone 15 and another cone, larger or smaller as the case may demand, may replace it after which it is inserted within the casing and the plug 29 screwed into the base. The arms 13 may be moved about the projection 27 to provide the necessary lateral adjustment should two of the teats be closer together than the other two, see dotted lines in Fig. 3.

A very material advantage of this device over any of the so-called suction milking machines lies in the fact that the animal cannot be injured by the working of the machine after all of the milk has been withdrawn from the udder, for it has been found by experience, first by hand milking and later by machine milking, that this hand motion or its imitation will not in any way injure the teat, neither bruising it nor dilating the opening, nor can blood be thus drawn from the teat.

I claim as my invention:

1. A milking machine including a frame with a convex top for centering the device against the under side of the animal's udder and between her teats, laterally extending means connected with said frame for holding each teat, and means movable against the teats for acting upon the same to discharge the milk therefrom.

2. A milking machine including a frame, means mounted in connection with said frame so as to be independently and horizontally oscillated and adjustable for holding the teats, and means movable against the teats for acting upon the same to discharge the milk therefrom.

3. A milking machine including a teat holder, a series of milking fingers horizontally and slidably reciprocable through one side of the teat holder for engaging the teat, and means for operating said fingers.

4. A milking machine including a teat holder, a series of milking fingers horizontally and slidably reciprocable through one side of the teat holder for engaging the teat, and means for operating said fingers arranged so that a starting movement of the fingers will be in succession from the upper one to the lower one, whereby milk will be gradually discharged from the teat.

5. A milking machine including a teat holder, a series of milking fingers horizontally reciprocable through one side of the teat holder for engaging the teat, springs tending to hold said fingers from operation, and a revoluble cam-like member for engaging the ends of said fingers and actuating them.

6. A milking machine including a teat holder, a series of milking fingers horizontally reciprocable through one side of the teat holder for engaging the teat, springs tending to hold said fingers from operation, and a revoluble cam-like member for engaging the ends of said fingers and actuating them, the surface of said cam-like member being provided with one or more spirally disposed recesses in order to bring about the desired succession of starting movements of the fingers.

7. A milking machine including a frame adapted to be located against the udder of the animal between the teats, a teat holder on said frame for each teat, a set of horizontally disposed fingers mounted in said teat holder for each teat, and a single centrally located means for actuating all of said fingers for all of the teats.

8. A milking machine including a frame adapted to be located against the udder of the animal between the teats, a teat holder on said frame for each teat, a set of horizontally disposed fingers, mounted in said teat holder for each teat, springs tending to force said fingers inwardly and a centrally located cam-like revoluble member engaging the inner end of all the fingers for all of the teats for actuating the same.

9. A milking machine including a frame adapted to be located against the udder of the animal between the teats, a teat holder on said frame for each teat, a set of horizontally disposed fingers mounted in said teat holder for each teat, springs tending to force said fingers inwardly, and a centrally located cam-like revoluble member engaging the inner end of all the fingers for all the teats for actuating the same, said cam-like member having its surface provided with spirally disposed grooves provided with recesses, whereby the fingers for all of the teats will not be simultaneously actuated.

10. A milking machine including a frame adapted to be placed against the under side of the animal's udder, a teat holder for each teat consisting of a stationary inner member and an outer hinged member whereby the teat holder can be closed after the device has been put in place, horizontally disposed milking fingers mounted in the inner member of each teat holder, and centrally located means for actuating the fingers in all of the teat holders.

11. A milking machine including a frame adapted to be placed against the under side of the animal's udder, an arm oscillatably mounted on the lower part of said frame and adapted to extend under each teat, whereby the arms may be adjusted under the various teats of the animal, and means for clamping said arms in an adjustable position, a teat holder on each arm, milking fingers mounted in each teat holder, and a centrally located means for operating all of said fingers.

12. A milking machine including a teat holder, a series of milking fingers horizontally reciprocable through one side of the teat holder for engaging the teat, each milking finger consisting of a rod with the end adjacent the teat made of yielding material, and means for actuating said fingers.

In witness whereof, I have hereunto affixed my signature in the presence of the witnesses herein named.

JOHN HUGGLER.

Witnesses:
  G. H. BOINK,
  E. H. MAYO.

---

Copies of this patent may be obtained for five cents each, by addressing the "Commissioner of Patents, Washington, D. C."